United States Patent

Koeber

[15] 3,685,891
[45] Aug. 22, 1972

[54] MOTION PICTURE CAMERA LAP DISSOLVE MECHANISM

[72] Inventor: Henry J. Koeber, Deerfield, Ill.

[73] Assignee: Bell & Howell Company, Chicago, Ill.

[22] Filed: Aug. 19, 1970

[21] Appl. No.: 64,953

[52] U.S. Cl.....................................352/91, 352/217
[51] Int. Cl..............................................G03b 21/36
[58] Field of Search................................352/91, 217

[56] References Cited

UNITED STATES PATENTS

| 3,545,852 | 12/1970 | Winkler | 352/91 |
| 3,246,944 | 4/1966 | Winkler | 352/91 |

*Primary Examiner*—S. Clement Swisher
*Attorney*—William F. Pinsak, John E. Peele, Jr., Kenneth W. Greb and William K. Serp

[57] ABSTRACT

A motion picture camera for effecting fades and dissolves. Control apparatus operates the camera mechanism during such exposures and substantially reduces the degree of manipulation required by the operator.

10 Claims, 16 Drawing Figures

Fig.1.
Inventor:
Henry J. Koeber.

Inventor:
Henry J. Koeber

Inventor:
Henry J. Koeber

Inventor:
Henry J. Koeber.

MOTION PICTURE CAMERA LAP DISSOLVE MECHANISM

BACKGROUND OF THE INVENTION

This invention relates generally to motion picture cameras and more particularly to a motion picture camera that effects fade-ins, fade-outs, and lap dissolves with a minimum of operator manipulation.

The principles of fading and lap dissolve exposures are well known and often used in the motion picture art. A fade-in exposure is generally effected by beginning an exposure with little or no light transmitted to the film and progressively increasing the light incident upon the film until the film is properly exposed for the given subject being filmed. Conversely, a fade-out progressively decreases the light incident upon the film from the proper exposure to a condition where substantially no light is incident upon the film.

Dissolve or lap dissolve exposures produce the well known effect of a new scene blending into a prior scene with the prior scene ultimately disappearing. Such an effect is the result of doubly exposing a fade-in over a fade-out. Because of the superimposition, the exposure of the dissolve remains substantially constant at the proper exposure level.

Quite apparently, the incorporation of fading and dissolve capabilities into a non-professional or home movie camera would be most desirable although it is obvious that any developments for non-professionals have equal applicability to professionals. As would be expected, several attempts have been made to provide such a camera to the home user.

Prior mechanisms have not met with widespread success because they suffered from two major disadvantages. Either they were too complex to be economically incorporated into a home movie camera, or the operation of the fading and dissolve capabilities required a plurality of operator manipulations that made them unattractive to the ordinary user.

SUMMARY OF THE INVENTION

This invention overcomes the disadvantages of the prior art by providing a control which effects fades and dissolves with a minimum of operator manipulation and with few additional parts being added to the normal movie camera.

Briefly stated, this invention provides control means that are mechanically coupled with the drive mechanism, the manually operable on-off trigger, and the fading mechanism. By so coupling those three elements, what little manipulation is required by the operator may be performed through the release trigger. As will become apparent in the following detailed description, the control means may be in the form of rotating discs which cause the system to recycle itself.

Other than the release trigger, the only manually operable member is a selector for selecting the desired form of exposure or for what is in essence deactivating the control in order that the camera may be operated in a normal manner without utilizing its fade and dissolve capabilities. While the photographic sequences that are possible with this invention may be expanded by manually operating the selector during filming, the larger number of capabilities may be effected by operating the selector when the camera is deactivated.

BRIEF DESCRIPTION OF THE DRAWINGS

The features and advantages of this invention will become more apparent from the description of the accompanying drawings in which like numerals refer to like parts.

In the drawings.

DETAILED DESCRIPTION OF A PREFERRED EMBODIMENT

Figure 1:
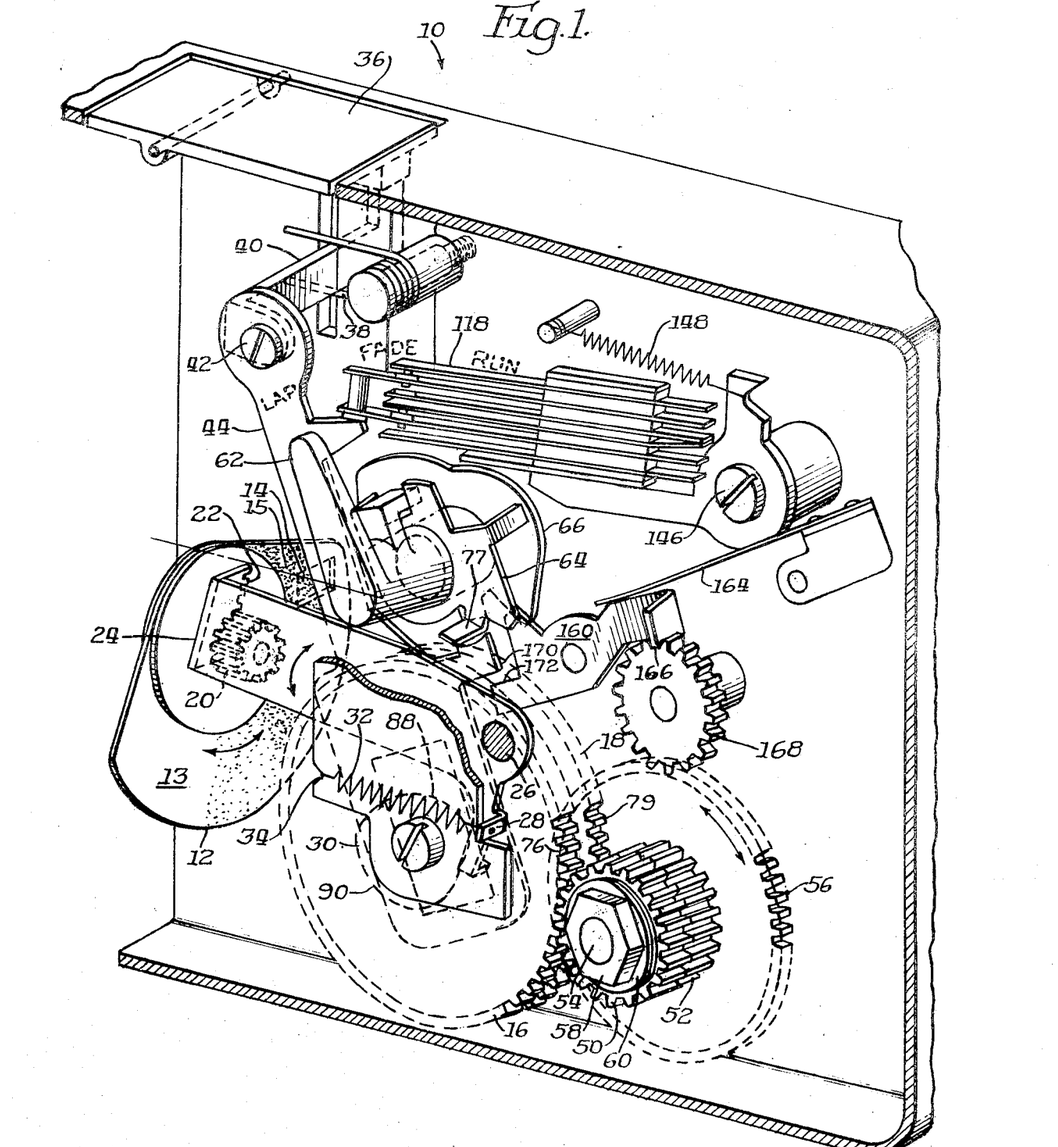
FIG. 1 is a perspective of an automatic control constructed in accordance with the principles of this invention.

Referring now to the figures, a movie camera indicated generally by the reference numeral 10 has been depicted in FIG. 1. Because this invention relates to a control for effecting fades and lap dissolves while allowing normal operation of any movie camera, all of the basic components of such a camera have not been illustrated. It is understood, however, that the camera 10 would include imaging optics, a viewfinder, a film supply, film transport means and drive means among many other components well known in the art.

Figure 2:
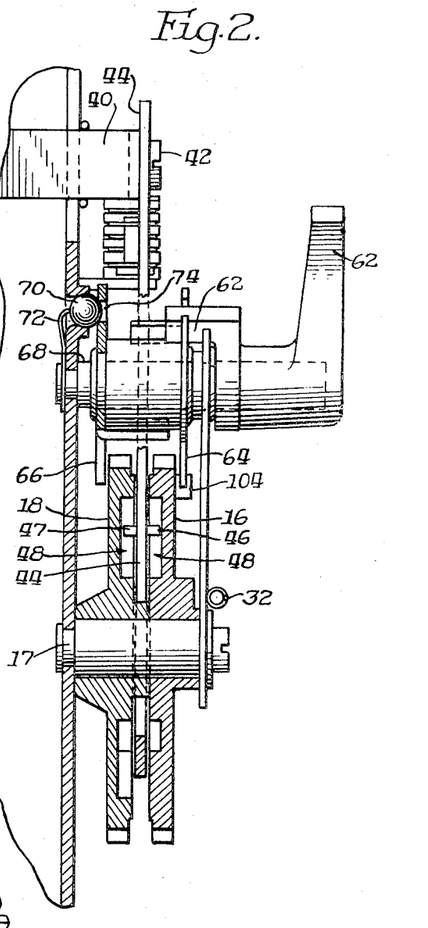
FIG. 2 is a cross-sectional view of the apparatus in FIG. 1.
Figure 3:
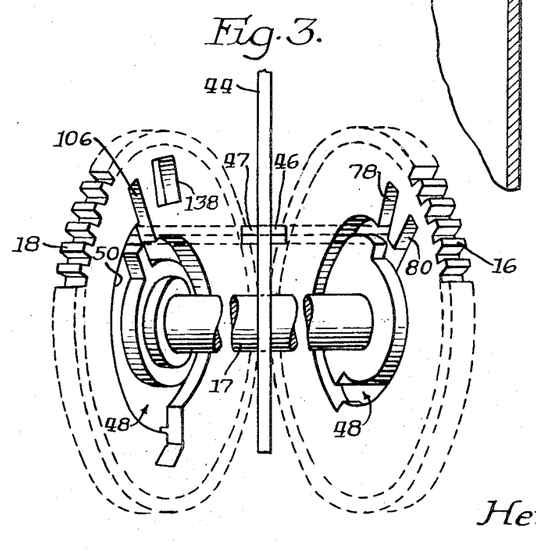
FIG. 3 is a folded perspective view showing the interaction of the automatic control with the on-off trigger.

In its basic form, this invention contemplates the provision of a fading device and a mechanism for cycling the camera through an operator selected photographic sequence. To that end, a variable density filter 12 is disposed in front of a film gate 14 and the camera 10 also includes a pair of rotatable sequencing gears 16 and 18 mounted on a shaft 17 (FIGS. 2 and 3).

The front sequencing gear 16, hereinafter referred to as FSG 16, controls the position and movement of the variable density filter 12. As shown in FIG. 1, the filter 12 is mounted for reciprocating rotation as indicated by the arrowheads to permit the full range of filter density from clear 13 to opaque 15 to pass in front of the film gate 14. To cause such rotation, a pinion 20 is secured to the filter 12 and engages a rack 22. The rack 22 is formed in a lever 24 that is pivoted at 26. A cam follower 28 is formed in the lever 24 and rides on a "-heart shaped" cam 30 that is integral with the FSG 16.

A spring 32 attached to stationary member 34 and the lever 24 urges the follower 28 against the "heart shaped" cam 30. Rotation of the FSG 16 also rotates the cam 30 and consequently the filter 12. The upper or left lobe 88 of the cam 30 causes fade-ins by rotating the filter 12 counter-clockwise until the clear portion 13 of the filter is in front of the film gate 14 and the lower or right lobe 90 causes a fade-out after a fade-in by rotating the filter 12 clockwise, returning it to the position shown in FIG. 1.

Not only does the FSG 16 control the operation of the filter 12, but also in conjunction with the back sequencing gear 18 (hereinafter referred to as BSG 18), it controls the camera operation during fades and lap dissolves. To effect control, the camera 10 includes an on-off trigger 36 which is spring biased upwardly to the OFF position by the coaction of a spring 38 and an arm 40 extending from the trigger 36. A suitable switch (not shown) is provided to activate a camera drive mechanism (not shown) that may be electrical or mechanical when the trigger 36 is depressed to a predetermined point.

Pivoted to the arm 40 at 42, a control link 44 extends downwardly between the FSG 16 and the BSG 18. Turning to FIGS. 2 and 3, the control link 44 includes a pair of pins 46, 47 that extend transversely from each side of the link 44 on a common horizontal plane. The pins 46, 47 are disposed to travel in internal recesses indicated generally at 48 that are formed within the FSG 16 and the BSG 18. Some of the recesses 48 have an upper edge, such as at 50, that maintains the pins 46, 47 at a level lower than that necessary to open the switch (not shown) that was closed when the trigger 36 was depressed. Accordingly, the camera will continue to operate until both pins 46, 47 are within recesses such as 106 and 78 that allow them to be raised sufficiently to deactivate the camera drive (not shown) by opening the switch (not shown). In that manner, the FSG 16 and the BSG 18 may remove control of the camera from the operator and control the shooting of fades and lap dissolves.

To rotate the FSG 16 and the BSG 18, a pair of drive gears 50, 52 (FIG. 1) are mounted for co-axial rotation on a shaft 54. They are frictionally coupled to a power gear 56 that is directly connected both to the main camera drive train (not shown) by the co-action of a nut 58 and a spring washer 60 and also to the shaft 54. Thus, the mounting assembly is in effect a frictional clutch, and the drive gears 50, 52 may rotate together, singly, or not at all when the power gear 56 is rotating.

In other words, the power gear 56 is continuously rotating while the camera is on. If both the FSG 16 and the BSG 18 are free to rotate, they will be rotated by the drive gears 50, 52. However, if either or neither the FSG 16 and the BSG 18 are free to rotate, the respective drive gears 50, 52 will remain stationary while the power gear 56 and the shaft 54 continue to rotate.

Aside from the trigger 36, the only necessary manipulation by the operator is the movement of a selector switch 62 which has three operative positions designated LAP, FADE and RUN in FIG. 1.

When the selector 62 is in LAP position, a lap dissolve will occur; when in FADE, a fade-in at the start of a scene and a fade-out at the end of the scene; and when in RUN, the camera will function as an ordinary camera having only on-off capabilities. The various operational modes are effected by a front selector cam 64 (hereinafter referred to as FSC 64) and a back selector cam 66 (hereinafter referred to as BSC 66).

Figure 4:
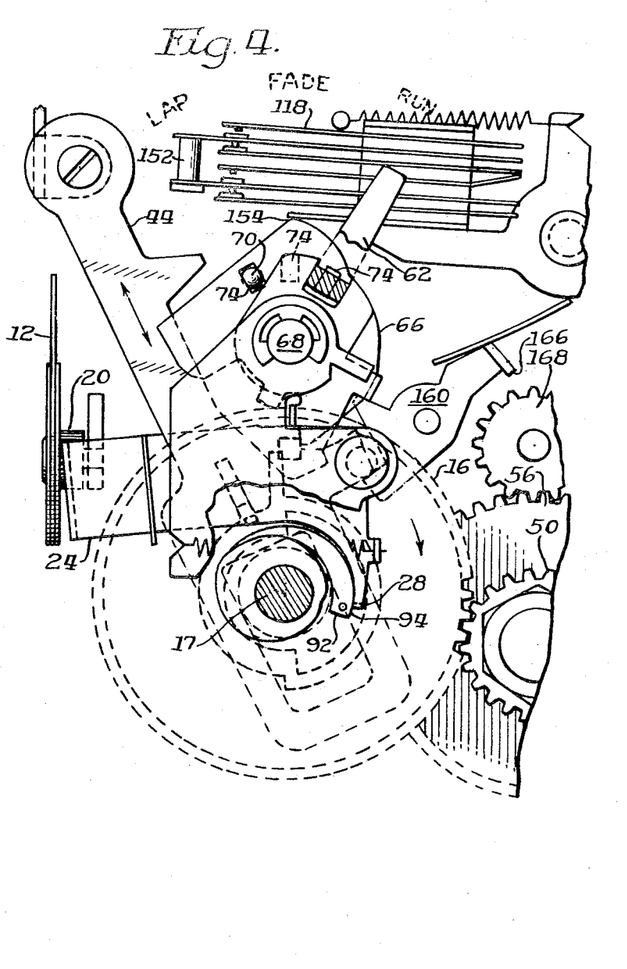
FIGS. 4, 7—10, 12 and 15 are front partial views of the apparatus depicted in FIG. 1 in varied operational modes.

As seen in FIGS. 2 and 4, the selector 62, FSC 64 and BSC 66 are mounted for co-axial rotation on a shaft 68. A ball 70 is urged forwardly by a spring 72 for cooperation with three rectangular cut-outs 74 in the BSC 66 to lock the selector 62 into one of the three LAP, FADE, RUN positions. The functions of the FSC 64 and the BSC 66 will be explained in greater detail hereinafter.

THE FRONT AND BACK SEQUENCING GEARS

Before discussing in detail the actual operational modes of the control, a detailed discussion of the FSG 16 and the BSG 18 is in order.

Figure 5:
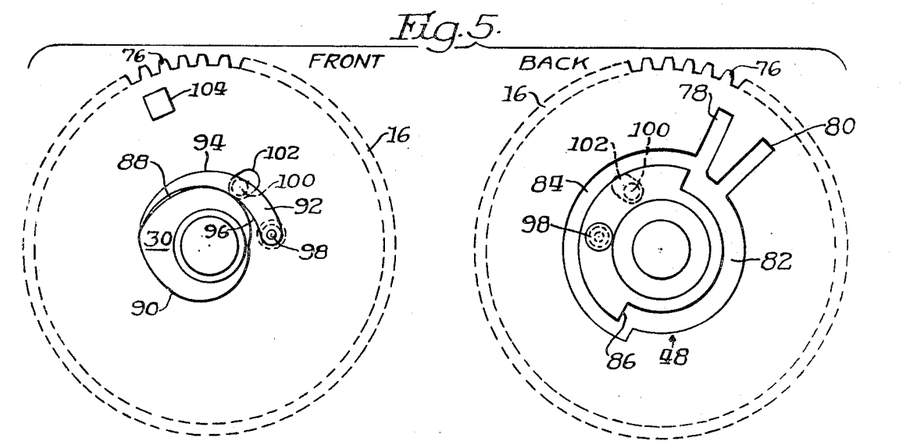
FIGS. 5 and 6 are front and back views of the sequencing gears which perform most of the automatic control features of this invention.

FIG. 5 illustrates the FSG 16 and, it may be seen that it includes perimetrically disposed gear teeth 76, which as set forth hereinbefore, mesh with a drive gear 50. The internal recesses indicated generally at 48 include a pair of off slots 78 and 80. They are referred to as off slots because they are of such a height that when the pin 46 is at the upper end of either slots 78, 80, the camera is deactivated by the main switch. For reasons to be more fully explained hereinafter, slot 80 functions as the off slot when the camera is operated in RUN and slot 78 functions as the off slot when the camera is operated in either FADE or LAP.

The FSG 16 further includes two substantially semicircular channels 82 and 84. The first of these channels 82 is of lesser radius than the other and comprises the fade-in channel. By that, it is meant that when the FSG 16 is being rotated in the forward direction as indicated by the arrowhead, which is the only direction the FSG 16 may rotate, and the pin 46 (FIG. 3) is moving within channel 82, the filter 12 is being rotated in such a manner as to effect a fade-in. The fade-in sequence will continue until the pin 46 abuts the fade-in stop surface 86 at which point the camera will begin a normal exposure because the FSG 16 can no longer move.

However, it is apparent that if the operator were to release the trigger 36, the pin 46 would be raised into the second channel 84. This channel 84 comprises the fade-out channel because when the FSG 16 rotates and the pin 46 is traversing that channel, a fade-out will occur.

As described briefly hereinbefore, the fading actions are caused by the rotation of the "heart shaped" fading cam 30 and its cooperation with the cam follower 28 that causes movement of the fading filter 12. As viewed in FIG. 5, rotation of the upper or left lobe 88 of the cam 30 causes a fade-in and the lower or right lobe 90 causes a fade-out.

A fingernail cam 92 is associated with the fading cam 30 and performs the dual functions of preventing an instantaneous fade-out after a run sequence and preventing switching the selector 62 from FADE to RUN during a fade-in. An outer surface 94 accomplishes the first result and an inner surface 96 the second. The exact nature of those functions will be described hereinafter.

The fingernail cam 92 is pivoted to the FSG 16 by a suitable pin 98 and its rotational arc is limited by a lug 100 that is affixed to the underside of the cam 92 and is positioned within a cut-out 102 formed in the FSG 16.

In order to prevent the FSG 16 from rotating during a RUN sequence, a stop 104 projects from the outer side thereof. The stop 104 abuts a portion of the FSC 64 when the selector 62 is in RUN.

If only fade-in and fade-out capabilities were desired in a camera, the principles embodied in the FSG 16 would be sufficient. However, in order to add lap dissolve capability, it is necessary to add a feature that rewinds film that has been exposed during a fade-out so a fade-in may be doubly exposed thereover.

Figure 6:
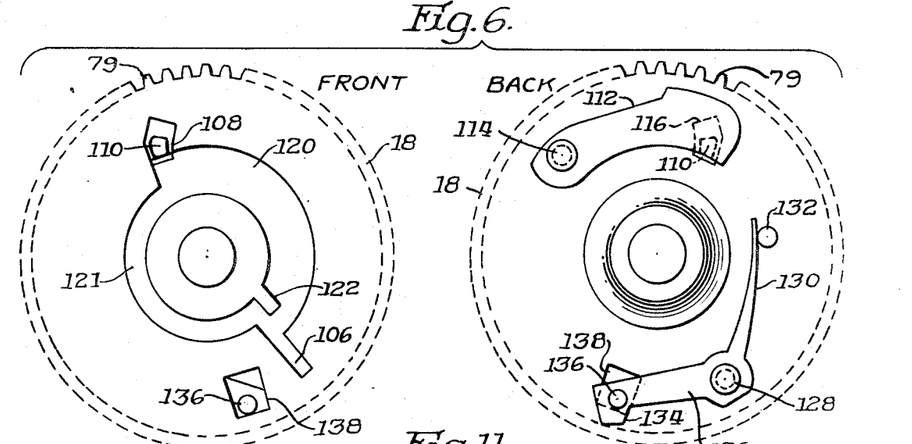

Reversal capability is present in this preferred embodiment in the form of the BSG 18 (FIG. 6) which has perimetrically disposed gear teeth 79 that mesh with a drive gear 52 (FIG. 1). The BSG 18 includes an internal RUN-LAP off slot 106 and an internal FADE off slot 108. As described hereinabove, in conjunction with the FSG 16, these slots allow the pin 47 (FIG. 3) to rise sufficiently to de-activate the camera. Placed within the FADE off slot is a reversal lug 110.

Figure 14:
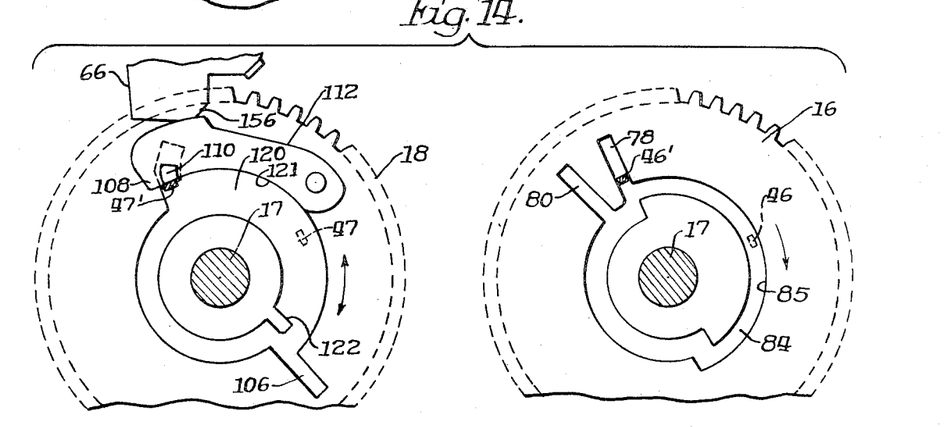

The reversal lug 110 is affixed to a lever 112 that is pivoted to the BSG 18 at 114. At the end of a fade-out cycle, the pin enters the FADE off slot 108 and, if the reversal lug 110 is free to pivot upwardly in the cut-out 116, the camera will be deactivated. But, when the camera is operating in LAP mode, the film drive must be reversed after the fade-out. Consequently, when in LAP mode, the BSC 66 depresses the reversal lug 110 to a point that prevents the pin 47 from entering the FADE off slot 108 (see FIG. 14). Simultaneously, with the pin 47 contacting the reversal lug 110, a reversal switch 118 (FIG. 1) is activated and the BSG 18 begins to rotate in the reverse direction with the pin 47 being contained in reversal channel 120. The reverse or rewind motion will continue until the pin 47 arrives at the LAP-RUN off slot 106. Although the exact nature of this sequence will be more fully described hereinafter, it should be noted that during such a reversal, the FSG 16 is stationary as the pin 46 has partially entered the FADE-LAP off slot 78 (FIG. 14).

Also included in the BSG 18 is a projection 122 which includes a fade-in stop surface 124 which functions to stop the rotation of the BSG 18 after a fade-in sequence until a fade-out sequence is desired. It corresponds to fade-in stop surface 86 in the FSG 16.

To prevent the BSG 18 from rotating during the RUN mode, a stopping mechanism 126 is pivoted at 128 to the BSG 18. A flexible arm 130 extends under a projecting lug 132. Such an arrangement allows the stop surface 134 to pivot to the extent of the freedom which lug 136 has in cut-out 138.

Figure 8:
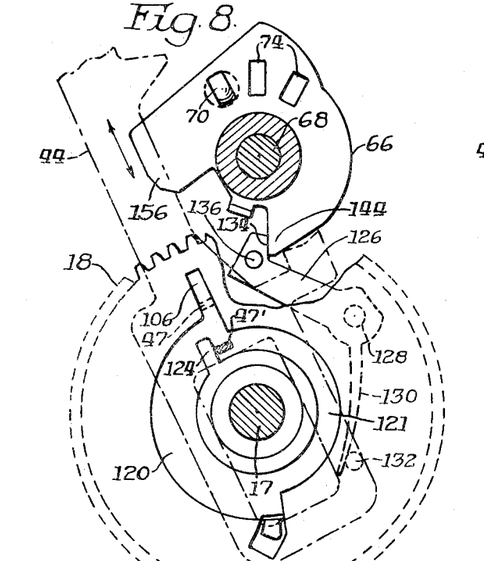

In RUN, a portion of the BSC 66 abuts stop surface 134 to prevent rotation of the BSG 18 (FIG. 8). While in LAP, the portion of the BSC 66 which depresses the reversal lug 110 will merely depress the stopping mechanism 126 by riding on canted surface 140 at the terminus of the reversing cycle.

THE RUN MODE OF OPERATION

Figure 7:
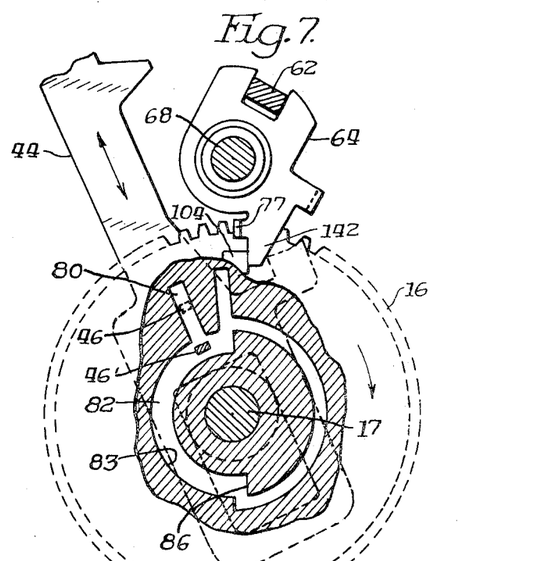

Referring now to FIGS. 4, 7 and 8, the operation of the camera in RUN mode will be described. For reasons which will become apparent later, those figures depict the position of the FSG 16 after at least one RUN cycle has been completed.

Referring to FIG. 4, the projection 77 on the FSC 64 has depressed the lever 24 to position the clear portion of the fading filter 12 in front of the film gate. The follower 28 rides on the outer surface 94 of the fingernail cam 92.

A downwardly projecting tab 142 (FIG. 7) on the FSC 64 abuts the stop 104 on the FSG 16 and thereby prevents forward rotation thereof. Similarly, a downwardly projecting tab 144 (FIG. 8) abuts surface 134 on stop mechanism 126 thereby preventing clockwise or forward rotation of the BSG 18.

The pins 46, 47 are aligned with the RUN off slot 80 and the RUN-LAP off slot 106 respectively and thus the control link 44 is free to move in the directions indicated by the arrow-heads; that is, from the off position 46, 47 to the on position 46', 47'. Thus, it is clear that when in RUN, the camera functions as a normal camera with the trigger 36 (FIG. 1) fully controlled by the operator.

THE FADE MODE OF OPERATION

In discussing the FADE mode of operation, it is appropriate at this point to first deal with switching the camera from RUN to FADE, secondly with the operation after repeated cycling in FADE, and lastly, with switching from FADE to RUN.

RUN TO FADE

The selector 62 may be moved from RUN to FADE either after a run exposure has been completed or during a run exposure. In both cases, the downwardly projecting tabs 142, 144 on the FSC 64 and the BSC 66 are moved out of interfering relationship with the respective stops 104 and 134 (FIGS. 9 and 10) when the selector 62 is rotated into FADE. Also, in both cases, the camera will become activated when the pins are at positions 46', 47' shown in FIGS. 7 and 8.

Figure 9:
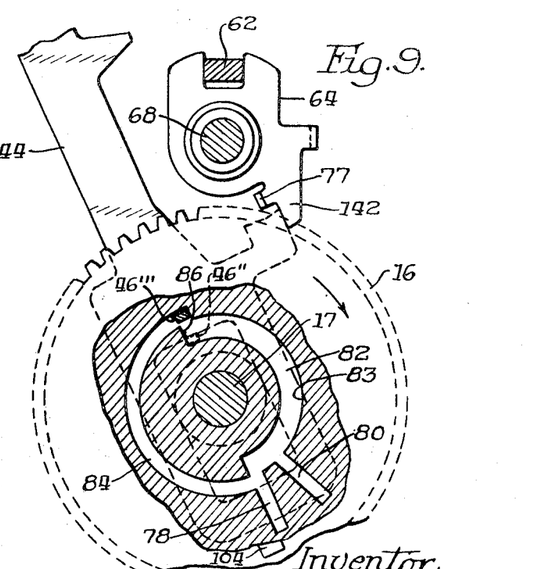
Figure 10:
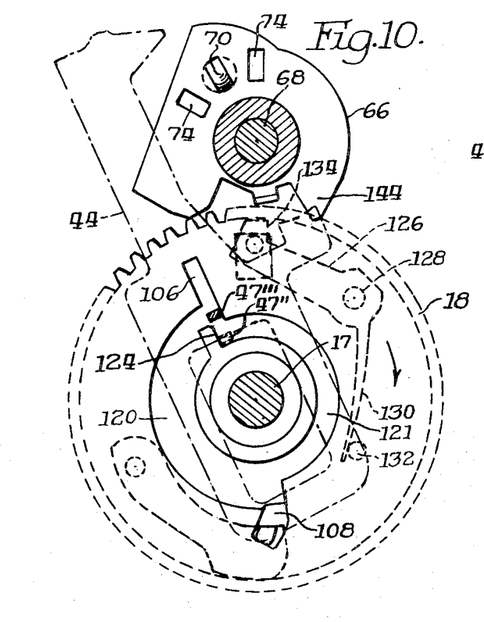

Referring to FIGS. 7 and 8, but assuming that the FSC 64 and the BSC 66 are in the FADE position shown in FIGS. 9 and 10, it is apparent that pin 46' does not impede the rotation of the FSG 16 and, therefore, the FSG 16 will rotate through the fade-in channel 82 until the pin abuts fade-in stop surface 86 as shown in FIG. 9 at 46''. During such a rotation of the FSG 16, the BSG 18 will not rotate because the pin at 47' abuts the fade-in stop surface 124. It should be pointed out that if the operator were to release the trigger 36 and thusly allow the pin 46' to rise while the FSG 16 is rotating through fade-in channel 82, the outer surface 83 would capture the pin at a height that would neither deactivate the camera nor allow the fade-in stop 124 on the BSG 18 to pass under the pin 47'.

The rotation of the FSG 16 just described would normally produce a fade-in exposure. However, as was noted during the discussion of the RUN mode, a projection 77 had moved the fading filter 12 to a position equivalent to the end of a fade-in cycle (FIG. 4). When the selector switch is moved to FADE, that projection 77 no longer acts on the lever 24 and if no other provision were made, an instantaneous fade-out would occur before the expected fade-in.

To prevent such a fade-out in this preferred embodiment, the fingernail cam 92 is provided. Its outer surface 94 is designed to maintain the filter 12 with its clear portion in front of the film gate during the first fade-in rotation of the FSG 16 after a RUN sequence. Consequently upon switching from RUN to FADE, a fade-in will not occur until after a fade-out as will be next described.

Figure 11:
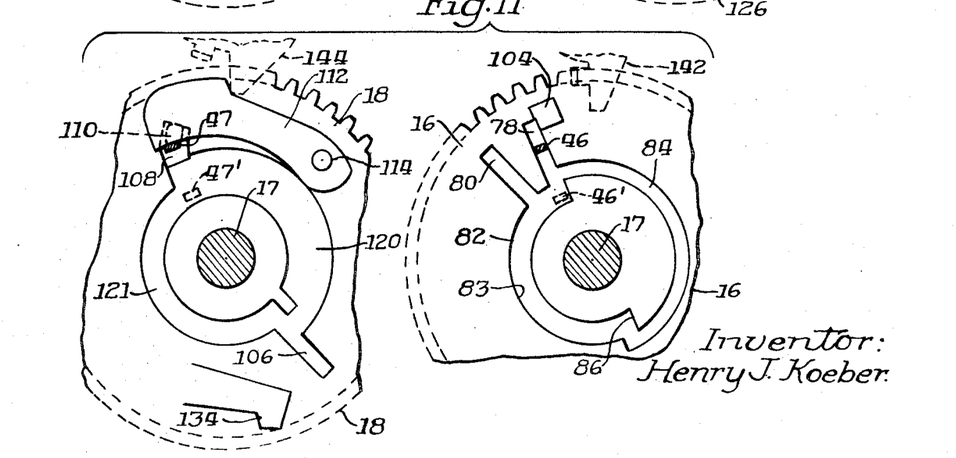
FIGS. 11, 13, 14 and 16 are schematic illustrations of various operational relationships of the sequencing gears and the on-off trigger.

After the above described "dummy" fade-in rotation, the pins 46'', 47'' will now abut their respective fade-in stop surfaces 86, 124 as shown in FIGS. 9 and 10. While the pins 46'', 47'' are maintained in that position by the operator exerting pressure on the trigger 36, normal filming will occur until the operator wishes to end the exposure and releases the trigger 36. At that point, the pins rise to the position shown at 46''', 47''', being trapped by the outer surface 85 of the fade-out channel 84 in the FSG 16. The pins, of course, no longer block the rotation of either sequencing gear 16, 18 and they will rotate clockwise until the pins enter the fade off slots 78 and 108 as shown in FIG. 11 at 46, 47. It should be clarified that FIGS. 11, 13, 14 and 16 are schematic illustrations of the pins co-acting with the slots and channels in the FSG 16 and the BSG 18 and that although the FSG 16 has been drawn in solid, it is viewed as assembled in FIG. 1, which accounts for the change in orientation from the back view in FIG. 5. During that rotation, the follower 28 follows the fade-out lobe 90 of the fading cam 90 causing the scene to end with a fade-out exposure.

REPEATED FADE CYCLES

Figure 12:
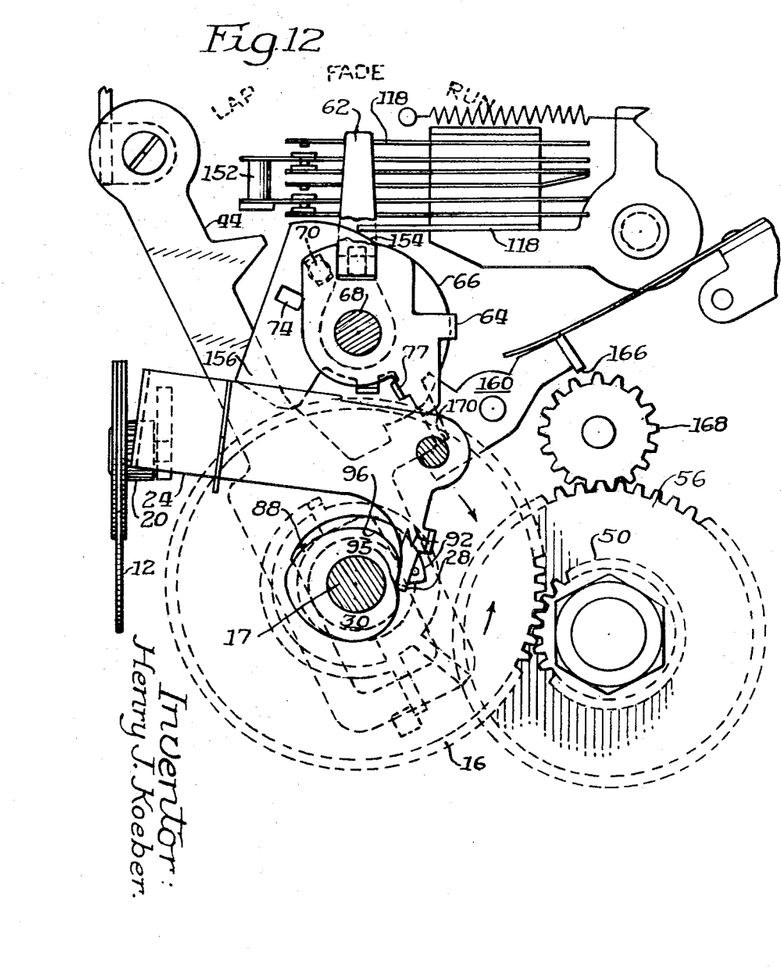

If the selector 62 is left in FADE, each exposure will begin with a fade-in and end with a fade-out. After a fade-out sequence, the pins are at 46, 47 as shown in FIG. 11, and the follower 28 is positioned in the "cleft" 95 of the "heart" shaped fading cam 30 as shown in FIG. 12. Furthermore, the follower 28 is underneath the fingernail cam 92 and thus subsequent fade-in rotations of the FSG 16 will cause a fade-in because the follower 28 now rides on the fade-in lobe 88 of the fading cam 30.

Repeated operation in FADE always begins with the pins in the position designated 46, 47 in FIG. 11. Depressing the trigger 36 lowers the pins to 46', 47' and allows the FSG 16 to rotate through the fade-in channel 82 causing a fade-in and the BSG 18 to rotate through channel 121 which has no effect on the exposure. After the fade-in rotations, the pins abut the fade-in stops 86, 124 at position 46'', 47'' in FIGS. 9 and 10. Normal photography may then continue for the desired length of time until the operator wishes to end the scene by releasing the trigger 36, which allows the pins to rise to position 46''', 47''' (FIGS. 9 and 10) and the fade-out rotation to continue until the FSG 16 and the BSG 18 reach the position 46, 47 shown in FIG. 11 whereupon the camera is deactivated.

FADE TO RUN

As has been demonstrated, if the selector 62 is left in FADE, a scene begun with a fade-in must be ended with a fade-out. Since it may be desirable to avoid a fade-out ending the selector 62 may be moved to RUN while operating in FADE. Furthermore, the selector 62 may be moved to RUN after a fade-out or, in other words, when a FADE cycle has been completed.

Considering the situation when the switch to RUN is made during operation in FADE, the change should be made only when the camera is functioning normally after the fade-in but before the fade-out has commenced. That position is depicted at 46'', 47'' in FIGS. 9 and 10.

Any attempt to so move the selector switch during a fade-in will be stopped because the follower 28 is trapped by the underside 96 of the fingernail cam 92 (FIG. 12). Therefore, the projection 77 on the FSC 64 will not be able to depress the lever 24 and the selector 62 cannot be moved to RUN during a fade-in. In this preferred embodiment, no such interlock prevents the selector 62 from being moved to RUN during a fade-out and, thus, if that occurred, the fade-out would be ruined because the fade filter 12 will effect an instantaneous fade-in. It is apparent that a suitable interlock could be provided to prevent such a fade-in if its elimination were desired.

Assuming that the operator correctly moves the selector switch to RUN while the control is in the position depicted at 46'', 47'' in FIGS. 9 and 10, the downwardly projecting tabs 142 and 144 on the FSC 64 and the BSC 66 are brought into position to stop the rotation of the FSG 16 and the BSG 18. It may be seen in FIG. 10 that the tab 144 will immediately contact the stop surface 134 and, consequently, the BSG 18 will rotate no further, which, of course, is as it should be since the pin 47'' in FIG. 10 is in position to enter the RUN-LAP off slot 106 as it was at the end of a RUN cycle described in conjunction with FIG. 8.

Referring to FIG. 9, the tab 142 will not immediately contact stop 104 and consequently when the scene is to be ended and the pin is at 46''', the FSG 16 will rotate through the fade-out channel 84. Of course, a fade-out will not occur because the projection 77 moved the fade filter 12 into its clear position as seen in FIG. 4 when the selector 62 was moved to RUN. As may be visualized from FIGS. 9 and 10, the camera will become deactivated when the pins enter the FADE-LAP off slot 78 and the RUN-LAP off slot 106 as shown in FIG. 13 at 46, 47.

Figure 13:
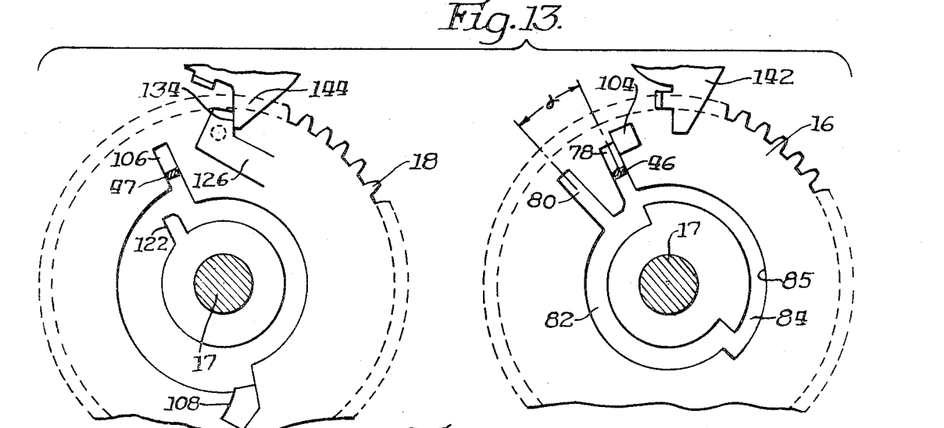

By comparing FIG. 13 to FIG. 7, it is clear that the FSG 16 is not in its normal off position in which the pin 46 enters run off slot 80 and the tab 142 abuts the stop 104. That normal position will not be obtained until the camera is again cycled in RUN and the FSG 16 rotates through the angle α between the FADE-LAP off slot 78 and the RUN off slot 80. At this point, the camera will function in RUN in the "normal" manner described in conjunction with FIGS. 7 and 8.

If the switch to RUN is made after a fade-out, both the FSG 16 and BSG 18 must rotate to arrive at the normal off position for a RUN. This is clarified by referring to FIG. 11 which at 46, 47 depicts the position of the pins after a fade-out. After the switch to RUN, neither stop tab 142, 144 (shown in phantom) contacts its associated stop 104, 134. The FSG 16 must rotate through the angle α and the BSG 18 through the extent of channel 121. Unlike the switch to RUN after a fade-in, the FSG 16 and the BSG 18 do assume their normal RUN off position as shown in FIGS. 7 and 8 after the first RUN cycle.

It should be pointed out that the rotation of the FSG 16 through α positions the follower 28 on the outer surface 94 of the fingernail cam 92 as depicted in FIG. 4. Such rotation did not occur when the camera was switched to RUN immediately after a fade-in but was deferred until an activation in RUN. Consequently, if the operator were to switch from FADE to RUN after a fade-in, deactivate the camera, and switch to FADE, the instantaneous fade-in which the fingernail cam 92 was designed to prevent would occur.

THE LAP MODE OF OPERATION

A lap dissolve photographic sequence is effected by doubly exposing a fade-in over a fade-out of substantially equal lengths. This preferred embodiment comprehends the accomplishment of a lap dissolve by rewinding a length of film which has been exposed as a fade-out. Consequently, apparatus is provided to rewind a segment of film that becomes activated only after a fade-out and leaves the fade controls in proper position to begin a fade-in in normal manner.

To that end, a reversing switch 118 (FIG. 1) is pivoted at 146 and urged downwardly by a spring 148. A laterally extending foot 150 is formed in the control link 44 that raises a flexible portion 152 of the reversal switch 118 to reverse the direction of the camera drive (not shown). When the camera is in FADE and/or RUN, a cam surface 154 raises the reversal switch 118 to a point that the foot 150 cannot engage and raise the flexible member 152 as seen in FIGS. 4 and 12.

To best understand the reversing mechanism in this preferred embodiment, reference should be made to FIG. 14 which illustrates the pins 46, 47 in the positions relative to the FSG 16 and the BSG 18 corresponding to the middle of a fade-out. If reversal were not desired, the pins would enter the FADE-LAP off slot 78 and the FADE off slot 108 at the end of the fade-out as shown at 46, 47 in FIG. 11.

Figure 15:
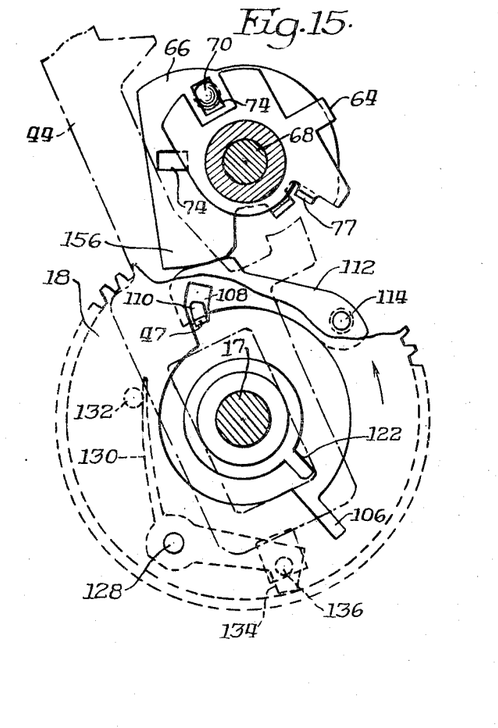
Figure 16:
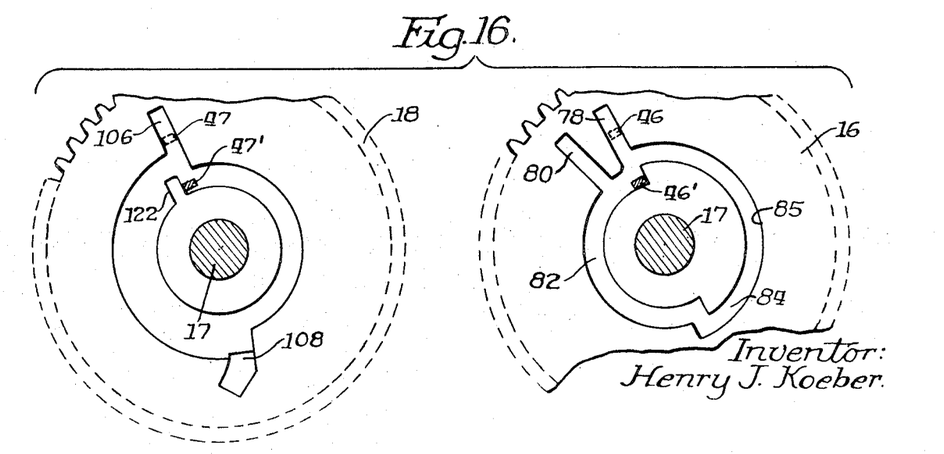

But, because of the action of tab 156 formed in the BSC 66 on the lever 112 (FIGS. 14 and 15), the reversal lug 110 prevents the pin 47' from entering the FADE off slot 108. Consequently, when the off slots arrive at the pins 46', 47', the camera is not deactivated because the FADE off slot 108 cannot be entered. However the pins 46', 47' do rise upwardly as shown by the partial entry into FADE-LAP off slot 78 and that small rise causes the foot 150 to lift the flexible member 152 and activate the reversal switch 118 as discussed above. It cannot be overemphasized that the foot 150 must be so disposed to contact the flexible member 152 as the pins rise from surface 85 to surface 121. As is clear from FIG. 14, the BSG 18 is free to rotate counter-clockwise or in the reverse direction until the pin 47 may enter the RUN-LAP off slot 106 as shown in FIG. 16 at 47.

Lap dissolves are now readily effected, as when the trigger 36 is depressed the pins become located at 46', 47' (FIG. 16), the FSG 16 rotates through the fade-in channel 82, and the fade-in is superimposed over the reversed fade-out. The pins reach the position shown at 46'', 47'' in FIGS. 9 and 10, a fade-out occurs in the usual manner and another reversal is effected as described above.

It should be apparent that if a scene has previously been shot in FADE, a new scene may be lap dissolved over the prior fade-out. Beginning from the pin position at 46, 47 in FIG. 11 which depicts the end of a fade-out if the selector 62 is moved to LAP, the depression of lug 110 will force the pins into the position shown at 46', 47' in FIG. 14. Accordingly, the camera drive will be reversed and a lap dissolve may be effected in the above described manner.

Furthermore, because the only mechanical difference between FADE and LAP is whether or not the reversing lug 110 is depressed, the selector 62 may be moved to LAP at any point during a FADE cycle and the selector may be moved from LAP to FADE at any time except during a reverse or rewind cycle. Likewise, the selector 62 may be moved from RUN to LAP at anytime and from LAP to RUN after the fade-in is completed.

USE WITH UNIDIRECTIONAL FILM CARTRIDGES

Many of the film cartridges in use at this time include a ratchet mechanism to prevent reversal of the take-up shaft. When used with that type of cartridge, the preferred embodiment includes means for loosely accumulating film in the take-up section of the cartridge so that it may be rewound to effect a lap dissolve.

Referring to FIG. 1, a lever 160 is pivoted on a shaft 162. A spring 164 biases a dog 166 formed on the lever 160 downwardly. The dog 166 may co-act with a spur gear 168 when it is permitted to pivot downwardly further than shown in FIG. 1. When the dog 166 prevents rotation of the spur gear 168, film may be accumulated a variety of manners, two of which are set forth in copending application Ser. Nos. 793,389, filed Jan. 23, 1969, now abandoned.

The specific manner of film accumulation need not be described in detail herein but the preferred embodiment includes means to restrict interaction of the dog 166 and the spur gear 168 to those times that fade-out exposures are being filmed. To do so, a lip 170 on the control link 44 rides on a shoulder 172 formed in the lever 160. The co-acting parts are adjusted such that during fade-in or normal exposures, the lip 170 is depressed far enough to lift the dog 166 out of interaction with the spur gear 168. However, when the pin 46 rises into the fade-out channel 84 as from 46'' to 46''' in FIG. 9, the dog 166 will interact with the spur gear 168 and prevent its rotation. That stoppage of rotation may be mechanically translated into film accumulation as set forth in the above identified copending applications. Obviously, if the invention is utilized with a bi-directional take-up spindle, the above mechanism is unnecessary.

What is claimed is:

1. In a motion picture camera, the combination comprising:
   drive means for transporting film;
   fading means for varying the light incident upon said film;
   manually operable trigger means for activating said drive means;
   control means for preventing de-activation of said drive means for a predetermined time period; and
   means for effecting a fading operation with said fading means during said predetermined time period.

2. In a motion picture camera, the combination comprising:
   drive means for operating said camera;
   fading means for effecting fade-in and fade-out exposures;
   a first movable means for operating said fading means;
   manually operable means for activating and de-activating said drive means;
   a second movable means for preventing de-activation of said drive means during said fading operations; and
   means coupled with said drive means for moving said first and second movable means.

3. In a motion picture camera, the combination comprising:
   drive means for moving photographic film;
   fading means for effecting fade-in and fade-out exposures;

a manually operable trigger for activating and de-activating said drive means; and selectively insertable control means for operating said fading means to effect a fade-in upon activation of said drive means at the beginning of a scene and for operating said fading means to effect a fade-out at the end of said scene, said fade-out being initiated by releasing said trigger, said control means preventing the de-activation of said drive means until said fade-out is completed.

4. In a movie camera, the combination comprising:

drive means for moving photographic film;

fading means for effecting fade-in and fade-out exposures;

reversing means for reversing the direction of said drive means;

manually operable trigger means for activating and de-activating said drive means;

automatic control means responsive to the activation of said drive means for causing said fading means to effect a fade-in at the beginning of a scene, said control means being further responsive to release of said trigger for causing said fading means to effect a fade-out at the end of said scene;

means for activating said reversing means at the end of said fade-out; and means for de-activating said drive means after said drive means has rewound the film exposed during said fade-out.

5. The movie camera set forth in claim 4 further comprising means for accumulating loose film in a film cartridge during said fade-out exposure.

6. In a motion picture camera, the combination comprising:

drive means for moving photographic film;

a reciprocating trigger for activating and de-activating said drive means, said trigger having a range of movement throughout which said drive means remains activated;

means for biasing said trigger toward a position which de-activates said drive means;

fading means for effecting fade exposures; and means responsive to movement of said trigger within said activation range for operating said fading means to effect a fade exposure.

7. In a motion picture camera, the combination comprising:

drive means for moving photographic film;

a reciprocating trigger for activating and de-activating said drive means, said trigger having a range of movement throughout which said drive means is activated;

means for biasing said trigger toward a position which de-activates said drive means;

fading means for effecting fade exposures;

means responsive to movement of said trigger from a first position in which said drive means is de-activated to a second position in which said drive means is activated for operating said fading means to produce a fade-in exposure; and means responsive to movement of said trigger from said second position to a third position within said activation range for operating said fading means to effect a fade-out exposure.

8. In a motion picture camera, the combination comprising:

drive means for moving photographic film;

a reciprocating trigger for activating and de-activating said drive means, said trigger having a range of movement throughout which said drive means is activated;

means for biasing said trigger toward a position which de-activates said drive means;

fading means for effecting fade exposures;

means responsive to movement of said trigger from a first position in which said drive means is de-activated to a second position in which said drive means is activated for operating said fading means to produce a fade-in exposure;

means responsive to movement of said trigger from said second position to a third position within said activation range for operating said fading means to effect a fade-out exposure; and means responsive to movement of said trigger from said third position to a fourth position within said activation range for reversing said drive means and rewinding the film exposed during said fade-out exposure.

9. In a motion picture camera, the combination comprising:

drive means for moving photographic film;

a reciprocating trigger for activating and de-activating said drive means, said trigger having a range of movement throughout which said drive means is activated;

means for biasing said trigger toward a position which de-activates said drive means;

fading means for effecting fade exposures;

means responsive to movement of said trigger from a first position in which said drive means is de-activated to a second position in which said drive means is activated for operating said fading means to produce a fade-in exposure;

means responsive to movement of said trigger from said second position to a third position within said activation range for operating said fading means to effect a fade-out exposure;

means responsive to movement of said trigger from said third position to a fourth position within said activation range for reversing said drive means and rewinding the film exposed during said fade-out exposure; and means for loosely accumulating exposed film during said fade-out exposure.

10. In a motion picture camera, the combination comprising:

drive means for transporting photographic film;

trigger means for activating and de-activating said drive means;

fading means for effecting fade exposures;

rotatable control means;

first coupling means for rotating said control means through a power train driven by said driven means;

second coupling means for operating said fading means by the rotational movement of said control means;

a pin connected to said trigger means;

means carried by said control means for capturing said pin during said fading exposure to prevent movement of said trigger means to a point at which said drive means is de-activated until said fading exposure is completed.

* * * * *